(12) United States Patent
Cosentino

(10) Patent No.: US 8,361,609 B2
(45) Date of Patent: Jan. 29, 2013

(54) COMPOSITE LAMINATE WITH SELF-HEALING LAYER

(75) Inventor: Enzo Cosentino, Bristol (GB)

(73) Assignee: Airbus Operations Limited, Bristol (GB)

( * ) Notice: Subject to any disclaimer, the term of this patent is extended or adjusted under 35 U.S.C. 154(b) by 191 days.

(21) Appl. No.: 12/736,145

(22) PCT Filed: Apr. 2, 2009

(86) PCT No.: PCT/GB2009/050330
§ 371 (c)(1),
(2), (4) Date: Sep. 15, 2010

(87) PCT Pub. No.: WO2009/127852
PCT Pub. Date: Oct. 22, 2009

(65) Prior Publication Data
US 2011/0003137 A1      Jan. 6, 2011

(30) Foreign Application Priority Data
Apr. 16, 2008   (GB) .................................. 0806921.3

(51) Int. Cl.
*B32B 27/04* (2006.01)
*B32B 27/12* (2006.01)
(52) U.S. Cl. ............... 428/297.4; 428/299.1; 428/299.4; 428/300.7; 428/304.4; 428/309.9
(58) Field of Classification Search ............... 428/297.4, 428/299.1, 299.4, 300.7, 304.4, 309.9
See application file for complete search history.

(56) References Cited

U.S. PATENT DOCUMENTS

| 4,818,584 A | 4/1989 | Eisenmann |
| 2008/0050612 A1 | 2/2008 | Dry |
| 2008/0057296 A1 * | 3/2008 | Dry ............................ 428/320.2 |

FOREIGN PATENT DOCUMENTS

| DE | 41 07 618 | 9/1992 |
| WO | WO 2007/003879 | 1/2007 |
| WO | WO 2007/003880 | 1/2007 |
| WO | WO 2007/005657 | 1/2007 |

OTHER PUBLICATIONS

International Search Report for PCT/GB2009/050330, mailed Jul. 15, 2009.
Written Opinion for PCT/GB2009/050330, mailed Jul. 15, 2009.
Search Report for GB 0806921.3, dated Aug. 7, 2008.

(Continued)

*Primary Examiner* — Betelhem Shewareged
(74) *Attorney, Agent, or Firm* — Nixon & Vanderhye, P.C.

(57) ABSTRACT

A composite structure comprising: a first stack comprising a plurality of plies of composite material and at least one ply of self-healing material, the ply of self-healing material comprising a plurality of containers each containing a curable healing liquid; and a second stack comprising a plurality of plies of composite material, the stacks being joined together at a bond line. By placing a ply of self-healing material in one of the stacks (preferably relatively close to the bond line) the ply of self-healing material can resist the propagation of cracks between the first stack and the second stack. Preferably the global strength of the first stack is greater than the global strength of the second stack.

6 Claims, 9 Drawing Sheets

OTHER PUBLICATIONS

Trask et al., "Bioinspired self-healing of advanced composite structures using hollow glass fibres", *J.R. Soc. Interface*, [Online], vol. 4, Dec. 19, 2006, pp. 363-371.

Yin et al., "Self-healing woven glass fabric/epoxy composites with the healant consisting of micro-encapsulated epoxy and latent curing agent", *Smart Materials and Structures*, vol. 17, No. 1, Feb. 1, 2008, p. 15019.

Yin et al., "Self-healing epoxy composites—Preparation and effect of the healant consisting of microencapsulated epoxy latent curing agent", *Composites Science and Technology*, vol. 67, No. 2, Dec. 8, 2006, pp. 266-3538.

Bleay et al., "A smart repair system for polymer matrix composites", *Composites Part A: Applied Science*, vol. 32, No. 12, Dec. 1, 2001, pp. 1767-1776.

Trask et al., Self-healing polymer composites: mimicking nature to enhance performance, *Dept. of Aerospace, University of Bristol*, (No Date), pp. 1-12.

\* cited by examiner

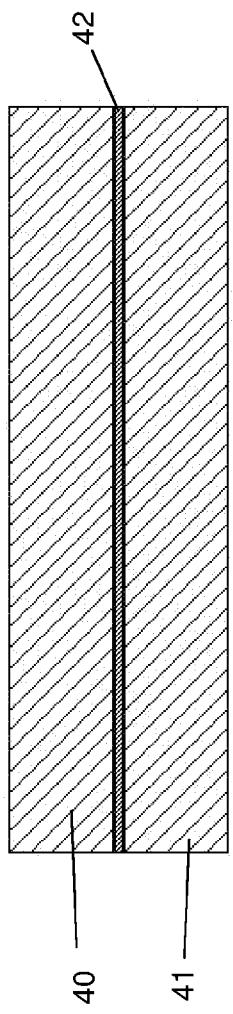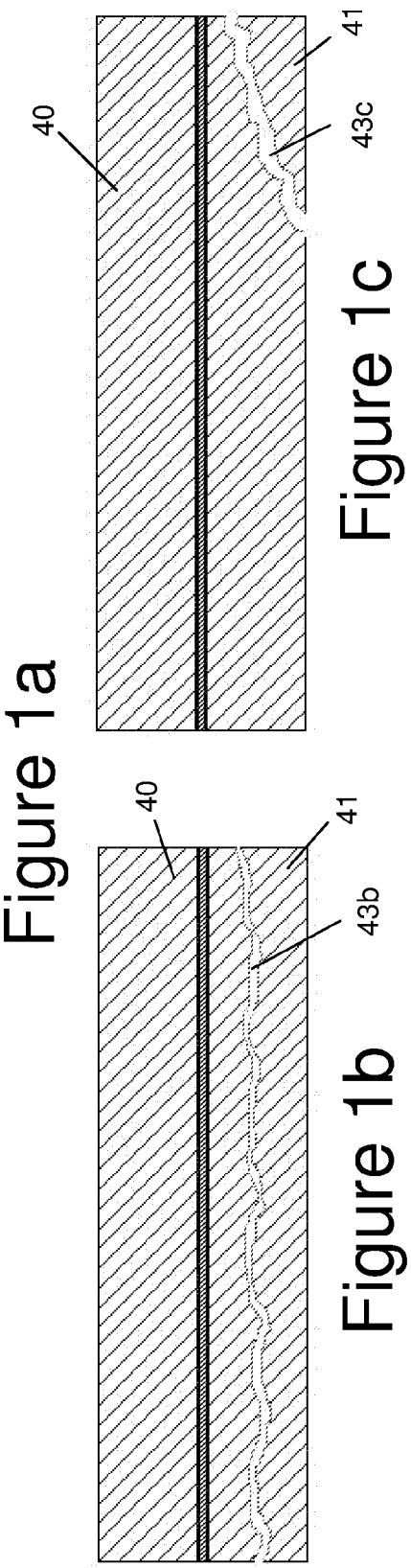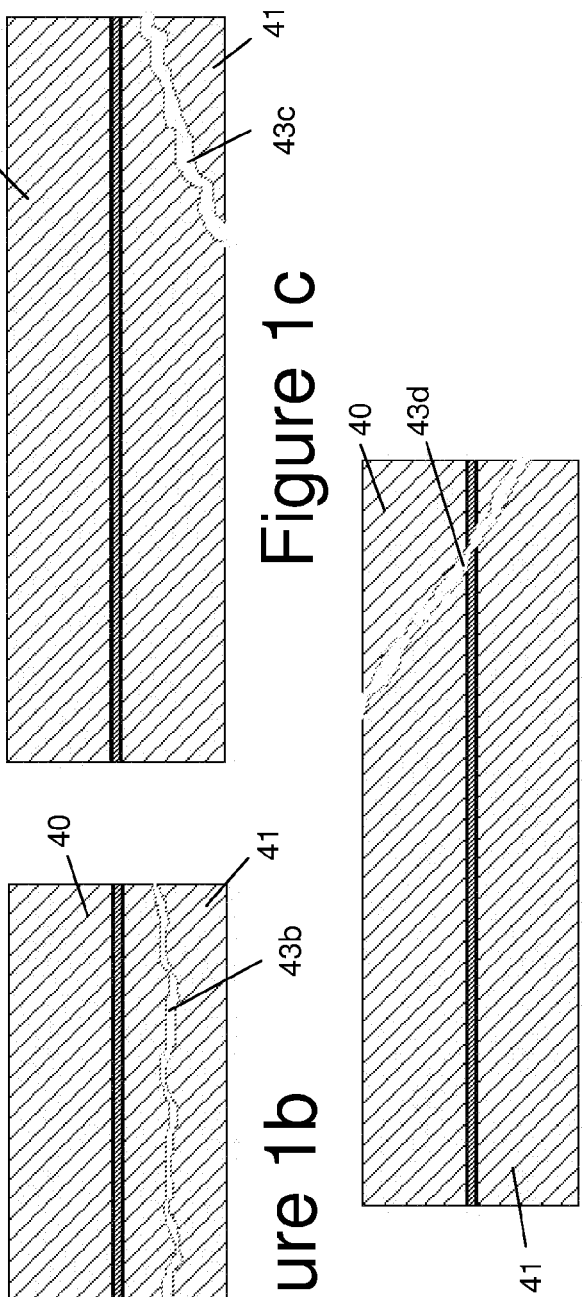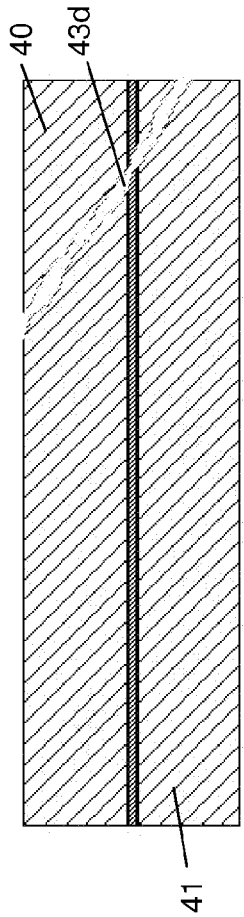

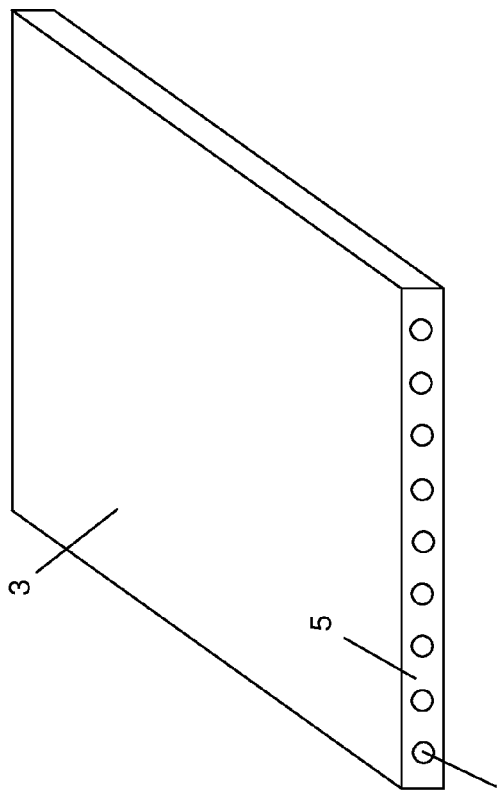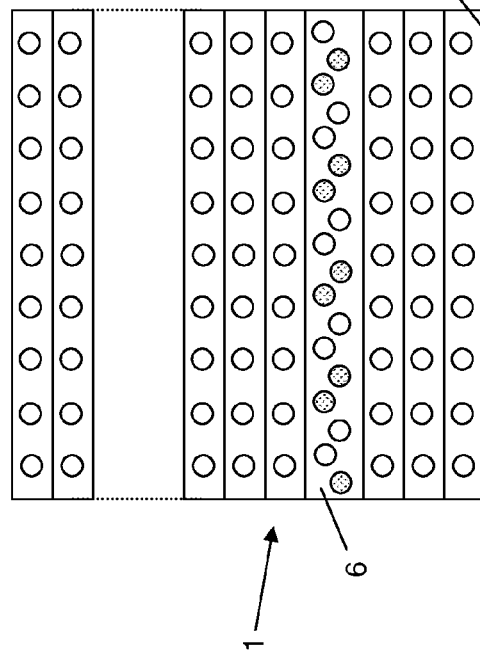

COMPOSITE LAMINATE WITH SELF-HEALING LAYER

This application is the U.S. national phase of International Application No. PCT/GB2009/050330 filed 2 Apr. 2009 which designated the U.S. and claims priority to GB Patent Application No. 0806921.3 filed 16 Apr. 2008, the entire contents of each of which are hereby incorporated by reference.

FIELD OF THE INVENTION

The present invention relates to a composite laminate structure, and a method of forming a joint between a pair of composite structures.

BACKGROUND OF THE INVENTION

FIG. 1a shows a bonded joint between a primary structure 40 and a secondary structure 41. Due to fatigue loading, cracks will propagate and follow a path which cannot be previously determined. Three different scenarios may be identified.

- The crack 43b propagates through the secondary structure 41, parallel to the bond line 42 (FIG. 1b). This will cause a global failure of the secondary structure 41, which will stop its collaboration with the primary structure 40. Generally this scenario is not catastrophic. If a fail-safe design philosophy is employed, failure of the secondary structure 41 will not generate global failure of the structure, which remains capable of withstanding the external loads.
- The crack 43c propagates toward the external surface of secondary structure 41 and extinguishes (FIG. 1c). This scenario can either cause global failure of secondary structure 41 or partially reduce its capability. In both cases, this will not cause global catastrophic failure of the whole structure, as the primary structure 40 remains pristine.
- The crack 43d propagates toward the internal surface of secondary structure 41 and then through the primary structure 40 (FIG. 1d). This scenario is not acceptable since it leads to catastrophic failure of the primary structure 40 and therefore must be avoided.

The ability to confine the crack within an established perimeter would simplify certification activity, increase the level of confidence, improve the reserve factor and the final global weight, and finally, increase safety.

Various self-healing structures are described in "Bioinspired self-healing of advanced composite structures using hollow glass fibres", R. S. Trask, G. J. Williams and I. P. Bond, *J.R. Soc. Interface* (2007) 4, 363-371, (doi:10.1098/rsif.2006.0194). A sixteen-ply glass-fibre laminate is described in which self-healing filaments were introduced at four damage critical ply interfaces. A sixteen-ply carbon-fibre laminate is also described in which healing glass fibre (HGF) was located at two interfaces within the lay-up, wound directly onto uncured carbon-fibre reinforced plastic (CFRP) plies prior to lamination. According to Trask et al, the incorporation of HGF as discrete plies was deemed unsuitable for CFRP laminates as it would effectively produce a hybrid glass-carbon laminate and result in a significant reduction to their outstanding mechanical properties.

SUMMARY OF THE INVENTION

A first aspect of the invention provides a composite structure comprising: a first stack comprising a plurality of plies of composite material and at least one ply of self-healing material, the ply of self-healing material comprising a plurality of containers each containing a curable healing liquid; and a second stack comprising a plurality of plies of composite material, the stacks being joined together at a bond line.

A further aspect of the invention provides a method of forming a composite joint, the method comprising: assembling a first stack comprising a plurality of plies of composite material and at least one ply of self-healing material, the ply of self-healing material comprising a plurality of containers each containing a curable healing liquid; assembling a second stack comprising a plurality of plies of composite material; and bonding the stacks together at a bond line after they have both been assembled.

A further aspect of the invention provides a method of deflecting a crack in the composite structure of the first aspect of the invention, the crack originating in the bond line or the second stack, the method comprising breaking at least some of the containers in the self-healing layer such that the curable healing liquid flows from the broken containers and cures, thereby deflecting the crack.

By placing a ply of self-healing material in one of the stacks (preferably relatively close to the bond line) the ply of self-healing material can resist the propagation of cracks between the first stack and the second stack. Preferably the global strength of the first stack is greater than the global strength of the second stack. Typically the first stack comprises N plies arranged in a stacking sequence including a first ply at one end of the stacking sequence which is adjacent to the bond line and an Nth ply at another end of the stacking sequence which is remote from the bond line, and wherein the ply of self-healing material is located relatively close to the bond line in the sense that its position in the stacking sequence is less than N/2.

Typically the ply of self-healing material is the first, second, third or fourth ply in the stacking sequence. Preferably the ply of self-healing material is not the first ply in the stacking sequence.

The stacks may be bonded together by a layer of adhesive. In this case the bond line will have a thickness equal to the thickness of the layer of adhesive. Alternatively the stacks may be bonded together by co-curing them. In this case the bond line will have zero thickness.

A further aspect of the invention provides a composite laminate structure comprising: a stack of plies of composite material, each ply of composite material comprising a plurality of reinforcement fibres embedded within a matrix; and one or more plies of self-healing material embedded within the stack of plies of composite material, each ply of self-healing material comprising a plurality of containers each containing a curable healing liquid, wherein the stack has a total thickness T2 and the plies of self-healing material have a total thickness T1, and wherein the ratio T1/T2 is less 0.1.

By making the ratio T1/T2 relatively low, then the propagation of cracks can be arrested without having a significantly deleterious effect on the buckling performance of the structure.

The following comments apply to all aspects of the invention.

The containers may be formed from a glass material or any other suitable material.

The containers and the reinforcement fibres may be formed from different materials.

In contrast to the teaching of Trask et al, it has been found that forming the containers from a different material does not result in a significant reduction to the mechanical properties of the laminate, particularly if the ratio T1/T2 is sufficiently low.

The ply of self-healing material may comprise a "prepreg" ply—that is, a ply in which the plurality of containers are impregnated with a matrix before the "prepreg" ply is assembled in the stack. Alternatively, instead of being assembled in the stack as a discrete "prepreg" ply, the containers may be fibres which are wound directly onto an uncured ply of the composite material prior to lamination, as described in Trask et al.

In the embodiments described below, the ply of self-healing material has containers but no reinforcement fibres. However, in an alternative embodiment the ply of self-healing material may comprise a plurality of containers intermingled with a plurality of reinforcement fibres.

The containers may comprise fibres, vesicles, or any other suitable hollow structure.

The containers in the ply of self-healing material may contain a one-part system of curable healing liquid. Alternatively the ply of self-healing material may further comprises a plurality of containers each containing a hardener liquid which cures the curable healing liquid on contact with the curable healing liquid. In a further alternative a catalyst or hardener may be contained within the matrix.

BRIEF DESCRIPTION OF THE DRAWINGS

Embodiments of the invention will now be described with reference to the accompanying drawings, in which:

FIGS. 1a-1d show a conventional bonded joint;
FIG. 2 shows a bonded joint according to a first embodiment of the invention;
FIG. 3 shows a single ply of CFRP.

DETAILED DESCRIPTION OF EMBODIMENT(S)

Figure 4:
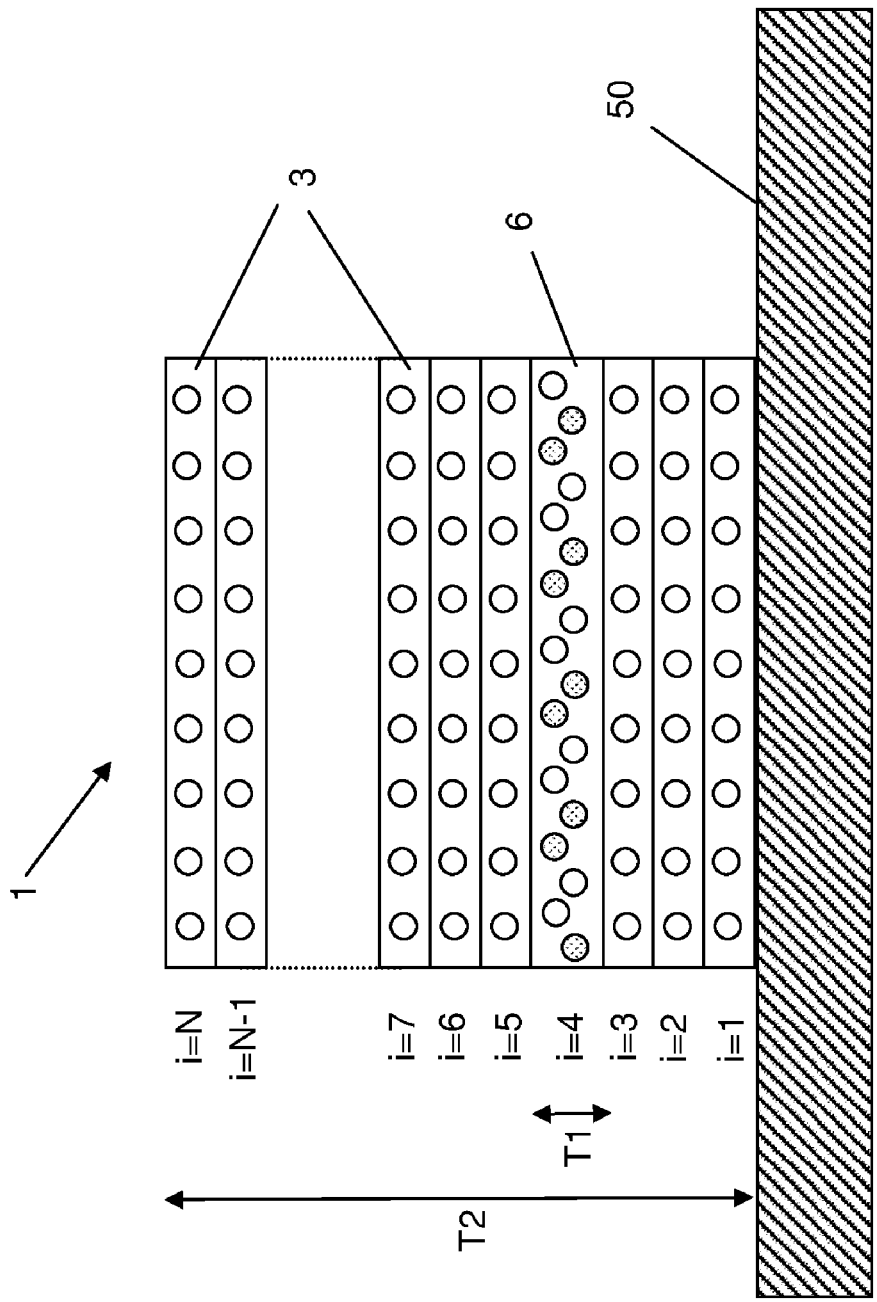
FIG. 4 shows the primary structure being laid-up.

The composite laminate structure shown in FIG. 2 comprises a primary structure 1 and a secondary structure 2 joined at a bond line 14. Each structure 1, 2 is formed by assembling a stack of plies of composite material. Each ply of composite material comprises a plurality of reinforcement fibres embedded within a matrix. An exemplary ply 3 is shown in FIG. 3. In this case the ply 3 is a so-called "prepreg" with a single layer of unidirectional carbon fibres 4 impregnated with a partially cured epoxy resin matrix 5. For ease of illustration the fibres 4 in the figures are all shown directed in an out of the page. However in practice the direction of the fibres can vary through the stack to give desired mechanical properties to the stack.

FIG. 4 shows how the primary structure 1 is formed. A stack of N plies of composite material is laid onto a table 50 in a stacking sequence including a first ply (i=1) at the bottom of the stacking sequence and an Nth ply (i=N) at the top.

Figure 5:
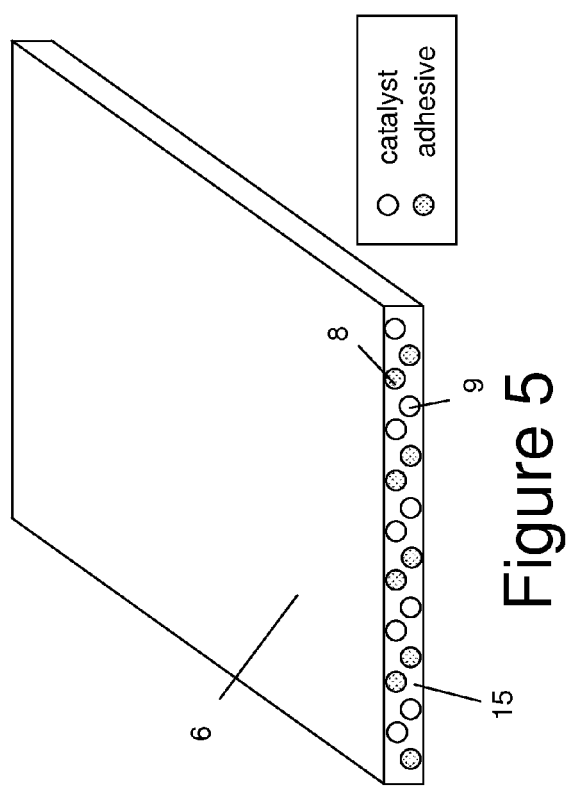
FIG. 5 shows a single ply of self-healing material.
Figure 6:
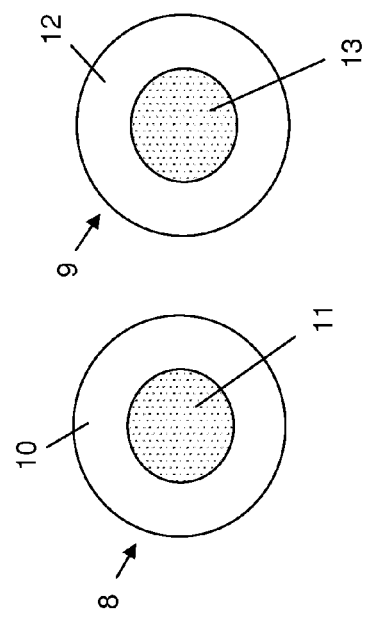
FIG. 6 shows two of the HGFs in detail.

The fourth ply 6 is a layer of self-healing material (referred to hereinafter as a "crack deflector"). The crack deflector 6 is shown in detail in FIGS. 5 and 6 and comprises a "prepreg" ply with a plurality of hollow fibres 8, 9 impregnated with a partially cured epoxy resin matrix 15 before the "prepreg" ply is assembled in the stack. As shown in FIG. 6, each fibre 8 comprises a hollow glass fibre 10 containing a liquid adhesive 11 such as Araldite® 2021/A resin, and each fibre 9 comprises a hollow glass fibre 12 containing a liquid catalyst 13 such as Araldite® 2021/B hardener. Since the adhesive and catalyst are contained in different hollow fibres, this ensures a longer shelf life.

For ease of illustration the fibres 8,9 in the figures are all shown directed in an out of the page, in the same direction as the fibres 4. However in practice the fibres 8, 9 can be oriented in any direction.

Figure 7:
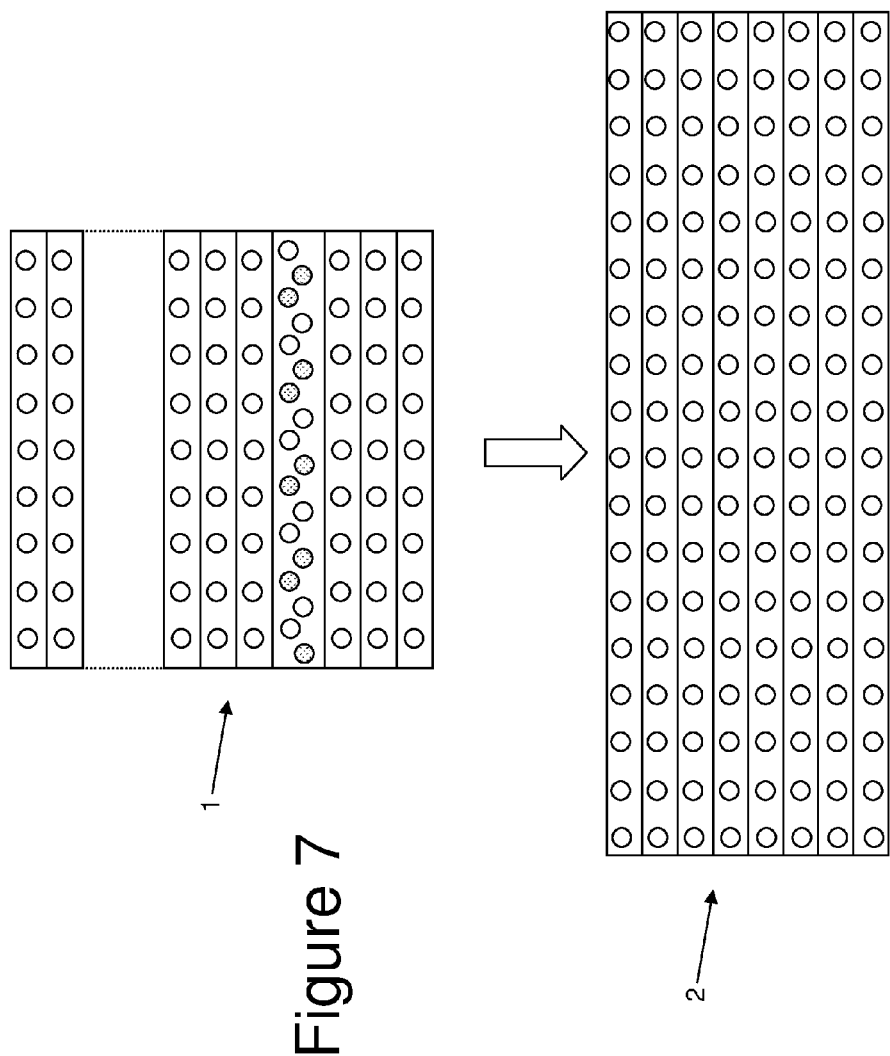
FIG. 7 shows the two stacks being brought together prior to co-curing.

After the stack shown in FIG. 4 has been assembled, it is partially cured in an autoclave. The secondary structure 2 is assembled and partially cured in a similar way. Next, the partially cured structures 1,2 are brought together as shown in FIG. 7 and placed in an autoclave where they are fully cured. During this co-curing process the structures 1, 2 become bonded together at the bond line 14.

Note that the stacking order of the primary structure 1 may be reversed from that shown in FIG. 4, that is with the crack deflector 6 being the N-3rd ply in the sequence, and the top (Nth) ply being adjacent to the bond line 14 in FIG. 2. In both cases the crack deflector 6 is located relatively close to the bond line.

The global strength of the secondary structure 2 is smaller than the global strength of the primary structure 1. Therefore if a crack initiates during cyclic loading of the joint, it will most likely be located somewhere within the secondary structure 2.

When the crack deflector 6 is impacted and/or undergoes fatigue cycles, the glass fibres 10, 12 break and the liquid adhesive 10 and catalyst 13 flows out, infiltrating the void created by the crack. This triggers two effects, which work synergistically to mitigate or arrest the propagation of cracks:

Energy absorption due to the liquid phase dumping propagation shock waves
Solidification, which will replace the material broken by the crack propagation with the solid adhesive system thus guaranteeing material continuity and a smoother load path and mitigating local stress concentrations at crack tips.

Figure 8:
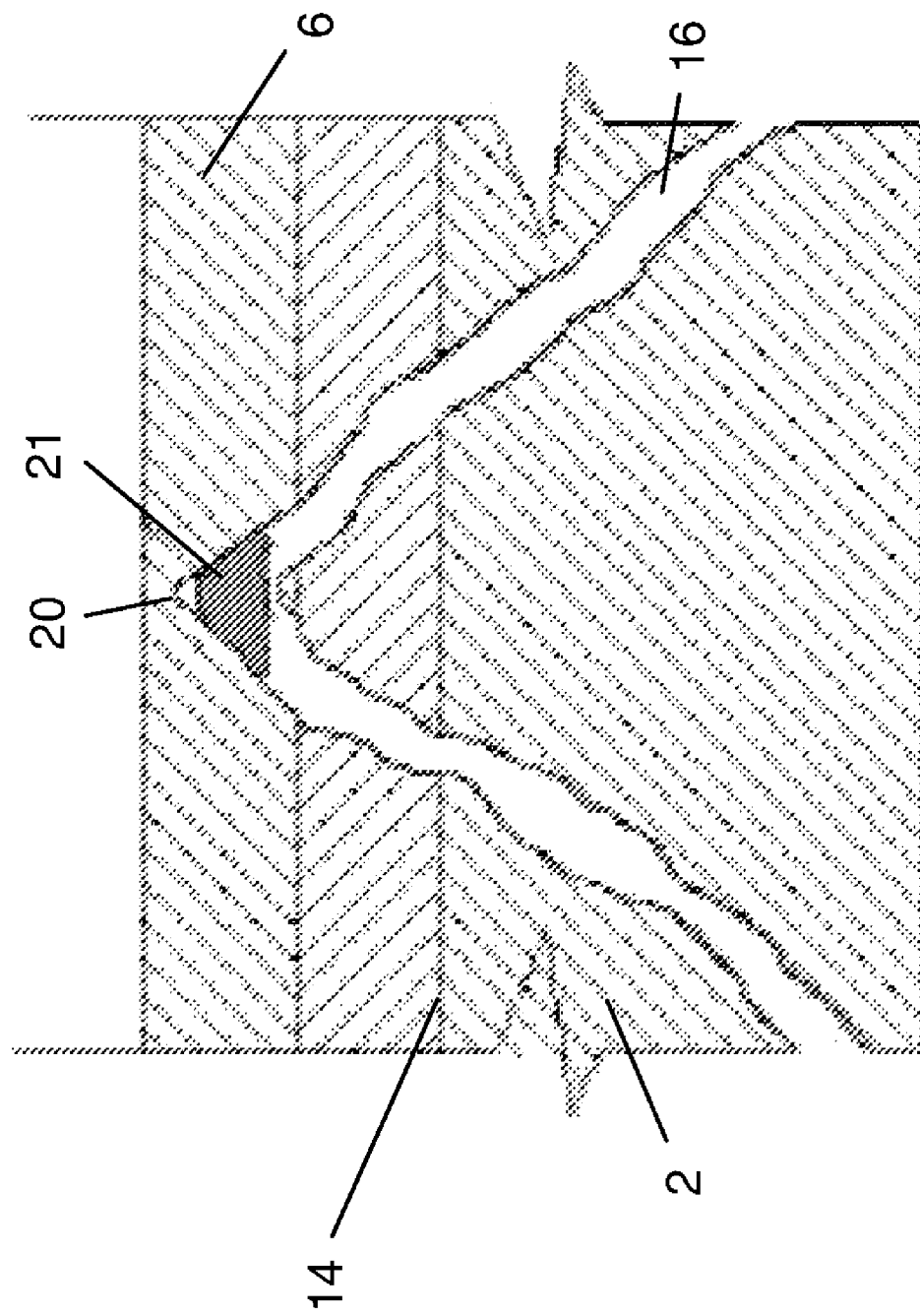
FIG. 8 shows a crack being deflected.

FIG. 8 shows the physical behaviour which occurs locally when a crack front originating in the bond line 14 or the secondary structure 2 encounters the crack deflector 6.

As soon as the crack 16 breaks the fibres in the crack deflector 6 the liquid adhesive will start infiltrating the void and solidifying to form a region of cured adhesive 20 thereby deflecting the crack. Evidently, due to the fatigue loading, the crack front will continue propagating and breaking new fibres, causing new adhesive to flow out and infiltrating the voids.

The adhesive/catalyst self-healing system can be "tuned" such that the amount of cured volume per unit time is comparable to the volume of void created by the crack propagation in the unit time. FIG. 8 shows the presence of a micro-void 21, which will remain after the crack is deflected as shown in FIG. 8. This is due to the fact that the viscosity of the liquid system does not allow total infiltration of the crack path. Minimization of the size of the micro-void 21 is desirable and can be ensured by appropriate selection of the curing speed and viscosity of the healing system. The size of the micro-void should preferably be comparable with the maximum micro-void statistically present within the crack deflector 6 as a result of the manufacturing process used.

Figure 9:
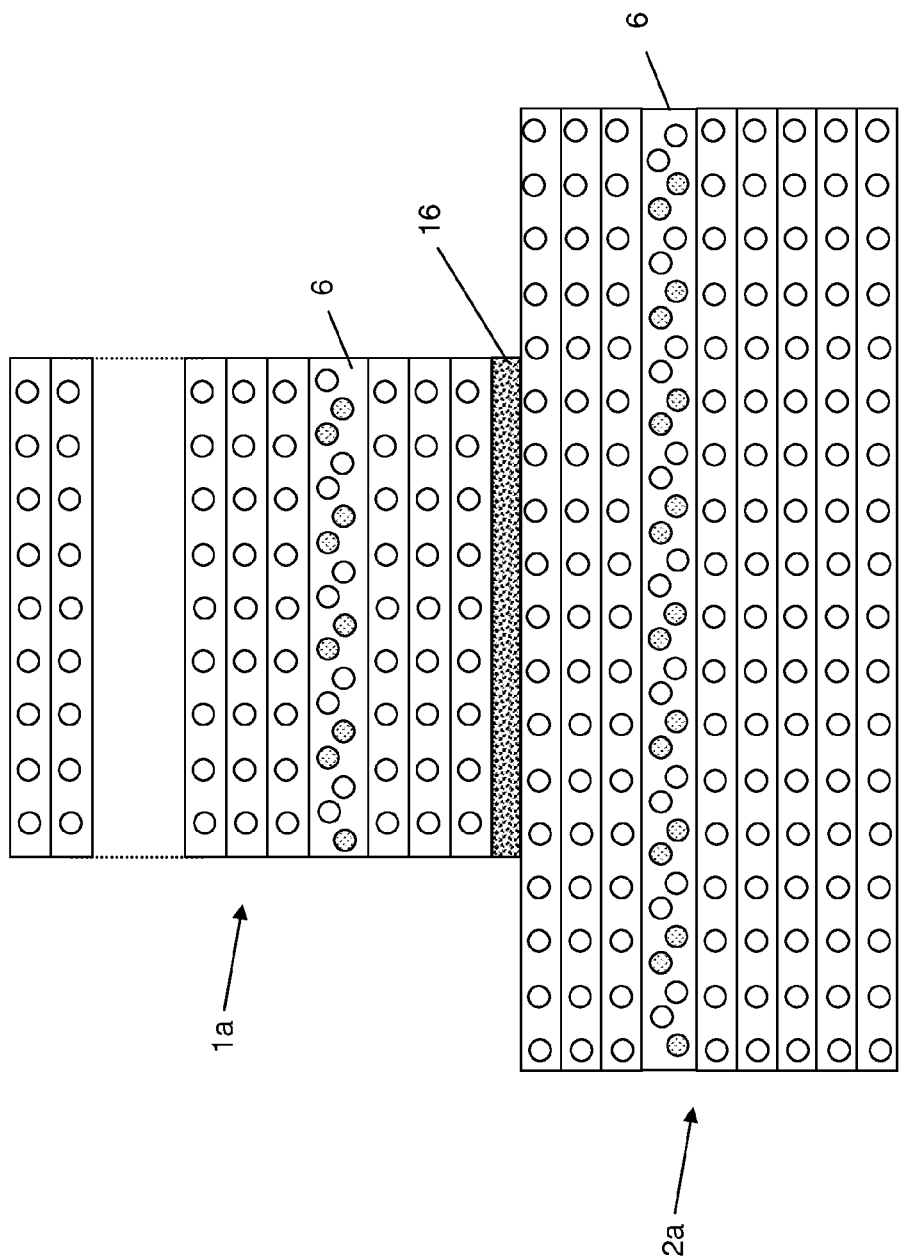
FIG. 9 shows a bonded joint according to a second embodiment of the invention.

FIG. 9 shows an alternative joint where instead of being co-cured, the primary structure 1a is bonded to the secondary structure 2a by a layer of adhesive 16 which in this case defines the bond line of the structure. In this case, the structures 1a, 2a are fully cured before they are bonded together. Note that in this example the fourth layer in the secondary structure 2a also contains a crack deflector 6.

Figure 10:
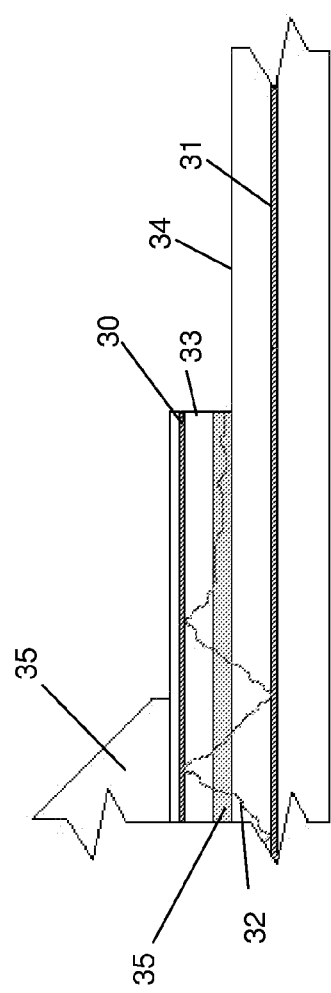
FIG. 10 shows a longitudinal section through an adhesively bonded joint between a stringer and a panel.
Figure 11:
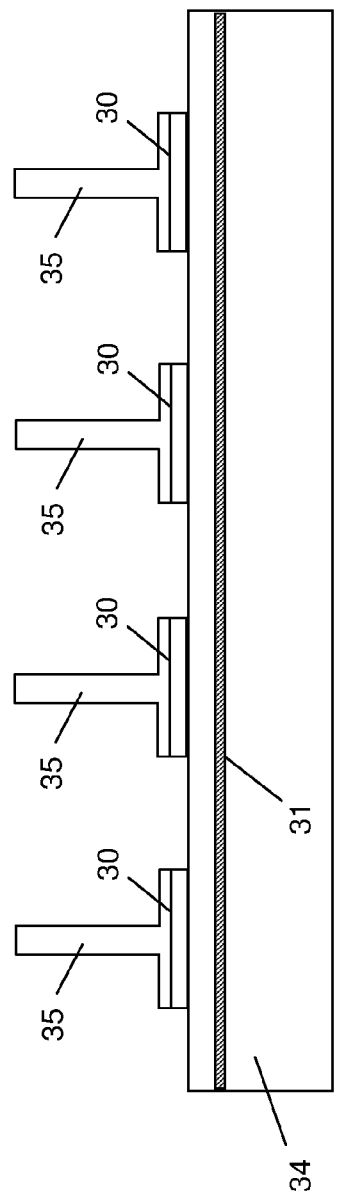
FIG. 11 shows a transverse section through the panel showing a plurality of stringers.

FIG. 10 illustrates a pair of embedded self-healing layers 30, 31 in a stringer run-out on a composite laminate panel 34. The panel 34 carries a number of stiffening elements (known as "stringers") which run along the length of the panel. The stringers are T-shaped as shown in FIG. 11, with a foot bonded to the panel 34 and a blade 35 extending perpendicular to the panel 34. The foot of each stringer extends beyond the blade as shown in FIG. 10 to form a so-called stringer run-out 33.

The upper self-healing layer 30 is embedded within a stack of "prepreg" composite plies which form the stringer run-out 33. The stringer run-out 33 is bonded to the composite panel 34 by a layer of adhesive 35. The composite panel 34 contains the lower self-healing layer 31. These two layers 30, 31 together form a "crack tunnel" confining a crack 32 between them.

Figure 12:
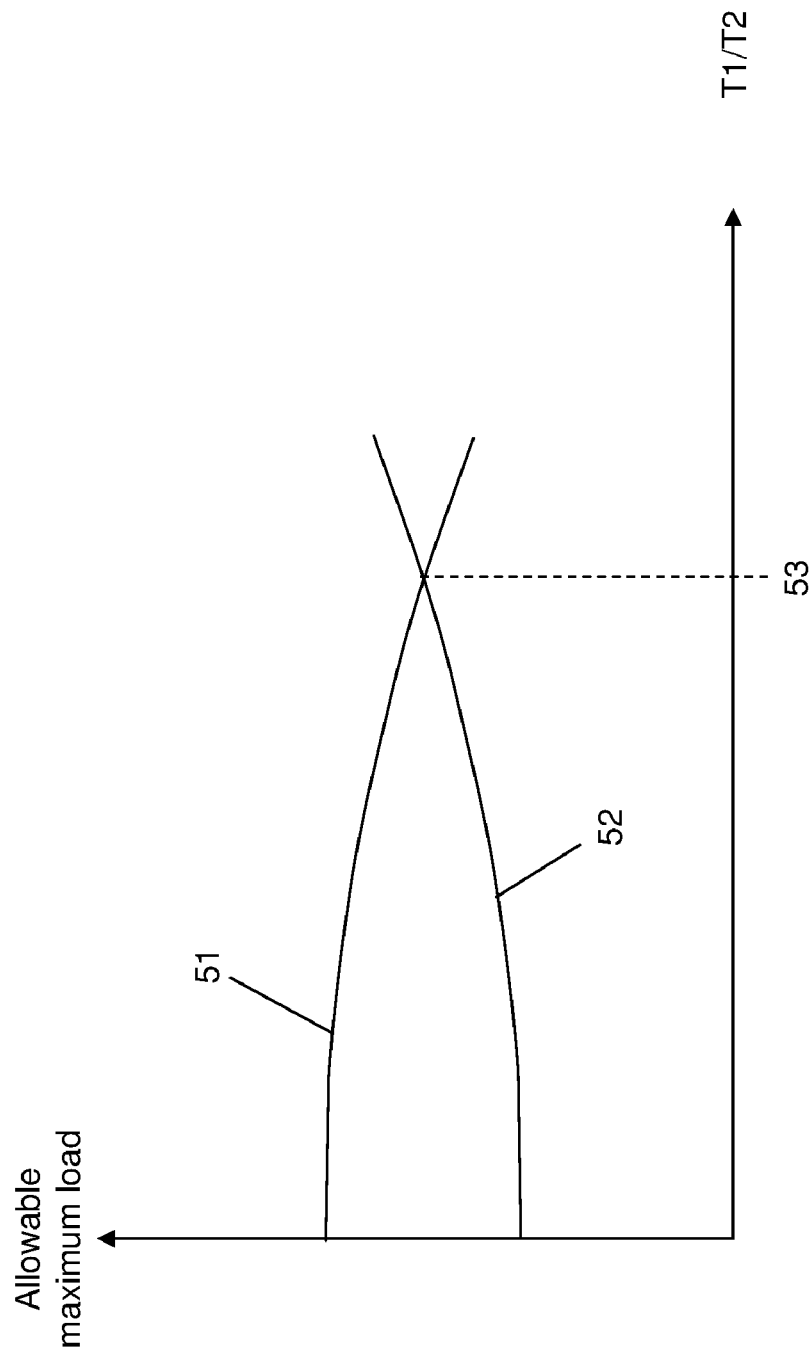
FIG. 12 is a graph showing how varying the number of crack deflectors can affect the mechanical properties of the structure.

Note that in the examples given above only a single crack deflector 6 is required in each component 1, 2. Note however that further crack deflectors may be integrated into the stack if required. FIG. 12 is a graph showing how varying the number of crack deflectors can affect the mechanical properties of the structure.

The X axis in FIG. 12 shows the ratio between T1 and T2, where T1 is the total thickness of crack deflectors and T2 is the total thickness of the structure. T1 and T2 are shown for example in FIG. 4. Where more than one crack deflector is present in the structure then T1 is the sum of the thicknesses of all of the crack deflectors.

Curve 51 shows a buckling allowables curve. That is, curve 51 shows the load at which the primary component 1 will buckle in response to a compressive load applied parallel to the plies in the stack. It can be seen that this buckling load 51 is at a maximum where no crack deflectors are present, and gradually decreases as T1/T2 increases.

Curve 52 is a fracture mechanics allowables curve. That is, curve 52 shows the allowable load for crack initiation and subsequent propagation into the primary structure. It can be seen that this load 52 is at a minimum where no crack deflectors are present, and gradually increases as T1/T2 increases. The curve 52 increases in this way because the chance of a crack propagating into the primary structure diminishes.

The point where the curves cross defines a threshold ratio 53 above which point the addition of further crack deflectors will globally degrade the mechanical performance of the structure. The threshold 53 will vary depending on the geometry of the structure, the thickness of the plies, the directions of the fibres in the various layers, and the materials used for the various plies. However in general it is expected that the threshold will be no greater than 0.3 in most cases, and most likely below 0.2.

The inventor has realised that by making the ratio T1/T2 significantly less than the threshold 53, the propagation of cracks can be arrested without having a significantly deleterious effect on the buckling performance of the structure. If we consider the stack of N plies shown in FIG. 4, then only 1/N of the plies are crack deflectors, where N is typically between 20 and 40. If we assume that the crack deflector 6 has a thickness which is the same as the thickness of one of the plies of prepreg 3, then this translates to a ratio T1/T2 which is less than or equal to 0.05.

Note that in the examples given above, the crack deflector is not the first ply in the stacking sequence immediately adjacent to the bond line. This is preferred for the following reason. To maximise the efficiency of the crack deflector it is preferred for the crack to initiate outside the crack deflector itself. Therefore if a crack initiates at the bond line (which is an area where a crack is likely to initiate) then by placing a few plies of prepreg 3 between the bond line and the crack deflector it is ensured that the crack will have to go through the full thickness of the crack deflector in order to propagate into the primary structure.

Although the invention has been described above with reference to one or more preferred embodiments, it will be appreciated that various changes or modifications may be made without departing from the scope of the invention as defined in the appended claims.

The invention claimed is:

1. A composite laminate structure comprising: a stack of plies of composite material, each ply of composite material comprising a plurality of reinforcement fibres embedded within a matrix; and one or more plies of self-healing material embedded within the stack of plies of composite material, each ply of self-healing material comprising a plurality of containers each containing a curable healing liquid, wherein the stack has a total thickness T2 and the plies of self-healing material have a total thickness T1, and wherein the ratio T1/T2 is less than 0.1.

2. The structure of claim 1 wherein the containers are formed from a glass material.

3. The structure of claim 1 wherein the containers and the reinforcement fibres are formed from different materials.

4. The structure of claim 1 wherein the ply of self-healing material further comprises a plurality of containers each containing a hardener liquid which cures the curable healing liquid on contact with the curable healing liquid.

5. The structure of claim 1 wherein the reinforcement fibres are carbon fibres.

6. The structure of claim 1 wherein the ratio T1/T2 is less than or equal to 0.05.

* * * * *